(12) United States Patent
Itabashi et al.

(10) Patent No.: US 11,377,100 B2
(45) Date of Patent: Jul. 5, 2022

(54) BEHAVIOR PREDICTION SYSTEM

(71) Applicant: SUBARU CORPORATION, Tokyo (JP)

(72) Inventors: Naoaki Itabashi, Tokyo (JP); Mitsuru Kono, Tokyo (JP); Satoshi Hoshino, Utsunomiya (JP); Takeshi Katsumoto, Utsunomiya (JP)

(73) Assignee: SUBARU CORPORATION, Tokyo (JP)

( * ) Notice: Subject to any disclaimer, the term of this patent is extended or adjusted under 35 U.S.C. 154(b) by 268 days.

(21) Appl. No.: 16/700,818

(22) Filed: Dec. 2, 2019

(65) Prior Publication Data

US 2020/0198631 A1      Jun. 25, 2020

(30) Foreign Application Priority Data

Dec. 19, 2018 (JP) .............................. JP2018-237263

(51) Int. Cl.
*G06T 7/277* (2017.01)
*G06T 7/246* (2017.01)
(Continued)

(52) U.S. Cl.
CPC ......... *B60W 30/0953* (2013.01); *G06T 7/251* (2017.01); *G06T 7/277* (2017.01); *G08G 1/166* (2013.01); *G08G 3/00* (2013.01); *G08G 3/02* (2013.01); *G08G 5/045* (2013.01); *G06T 2207/30241* (2013.01); *G08G 9/00* (2013.01); *H04N 5/145* (2013.01)

(58) Field of Classification Search
CPC ......... G06T 7/251; G06T 7/262; G06T 7/277; G06T 2207/0953; G06T 2207/0956; G08G 3/00; G08G 3/02; G08G 5/00; G08G 5/0008; G08G 5/0052; G08G 5/0078; G08G 5/0073; G08G 9/00; G08G 9/02

See application file for complete search history.

(56) References Cited

U.S. PATENT DOCUMENTS

| | | | | |
|---|---|---|---|---|
| 2010/0305858 A1* | 12/2010 | Richardson | ........ | G06K 9/00785 701/301 |
| 2014/0074767 A1* | 3/2014 | Horwood | ................. | B64G 3/00 706/52 |

(Continued)

FOREIGN PATENT DOCUMENTS

JP      2011-220727 A      11/2011

*Primary Examiner* — Kevin P Mahne
(74) *Attorney, Agent, or Firm* — McDermott Will & Emery LLP

(57) ABSTRACT

A behavior prediction system includes an information obtainer, a probability distribution model generator, a map generator, and a display. The information obtainer obtains information on a traveling direction of a moving object whose behavior is to be predicted. The probability distribution model generator generates a probability distribution model regarding a traveling direction of the moving object based on the information on an obtained traveling direction of the moving object. The map generator uses the probability distribution model to calculate probabilities that the moving object passes through respective areas into which a movable region of the moving object is divided and that generates a probability map in which the probabilities are assigned to the respective areas. The display displays the probability map.

15 Claims, 14 Drawing Sheets

(51) Int. Cl.
*H04N 5/14* (2006.01)
*G08G 3/02* (2006.01)
*G08G 5/04* (2006.01)
*G08G 1/16* (2006.01)
*B60W 30/095* (2012.01)
*G08G 3/00* (2006.01)
*G08G 9/00* (2006.01)

(56) References Cited

U.S. PATENT DOCUMENTS

| | | | |
|---|---|---|---|
| 2017/0069214 A1* | 3/2017 | Dupray | G08G 5/0013 |
| 2017/0190334 A1* | 7/2017 | Zelman | G08G 1/096783 |
| 2018/0047174 A1* | 2/2018 | Murata | G06T 7/251 |
| 2019/0186940 A1* | 6/2019 | Hwang | G01C 21/3446 |

* cited by examiner

FIG.5A

| bH | bA | bB |
|---|---|---|
| bG | $B_{i-1}$ | bC |
| bF | bE | bD |

FIG.5B

| bW | bX | bI | bJ | bK |
|---|---|---|---|---|
| bV | bH | bA | bB | bL |
| bU | bG | $B_{i-1}$ | bC | bM |
| bT | bF | bE | bD | bN |
| bS | bR | bQ | bP | bO |

A  b1

A  b1

BEHAVIOR PREDICTION SYSTEM

CROSS-REFERENCE TO RELATED APPLICATION

This application is based upon and claims the benefit of priority from the prior Japanese Patent Application No. 2018-237263, filed on Dec. 19, 2018, the entire contents of which are incorporated herein by reference.

BACKGROUND

The present disclosure relates to a behavior prediction system, in particular, a system for predicting the behavior of a moving object such as an airplane, a ship, or a vehicle.

The behavior of the moving object for avoiding collision with or for tracking a moving object such as an airplane, a ship, or a vehicle is to be predicted, if information on a future course and the like cannot be obtained from the moving object.

In order to accurately estimate the future position and the like of a moving object, conventional behavior prediction systems predict the position of the moving object, for example, as a point or a line in a two-dimensional or three-dimensional coordinate space during switch and usage of a motion model (for example, uniform linear motion, uniform acceleration motion, circular motion, and the like) for approximating the motion of the moving object, correction of errors, and the like (See, for example, Japanese Patent Application Laid-Open Publication No. 2011-220727).

That is, when predicting the future behavior of a moving object, the conventional behavior prediction system often predicts the behavior of the moving object as a path in a two-dimensional or three-dimensional coordinate space.

SUMMARY

An aspect of the present disclosure provides a behavior prediction system. The system includes an information obtainer, a probability distribution model generator, a map generator, and a display. The information obtainer obtains information on a traveling direction of a moving object whose behavior is to be predicted. The probability distribution model generator generates a probability distribution model regarding a traveling direction of the moving object based on the information on an obtained traveling direction of the moving object. The map generator uses the probability distribution model to calculate probabilities that the moving object passes through respective areas into which a movable region of the moving object is divided and that generates a probability map in which the probabilities are assigned to the respective areas. The display displays the probability map.

BRIEF DESCRIPTION OF THE DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein:

FIG. 5A is a diagram illustrating cells $B_i$ that can be moved from the cell $B_{i-1}$ in the next one iteration if the moving object is set to move one cell in one iteration;

FIG. 5B is a diagram illustrating cells $B_i$ that can be moved from the cell $B_{k-1}$ in the next one iteration if the moving object can move two cells or less in one iteration;

DETAILED DESCRIPTION OF EMBODIMENTS

Figure 1:
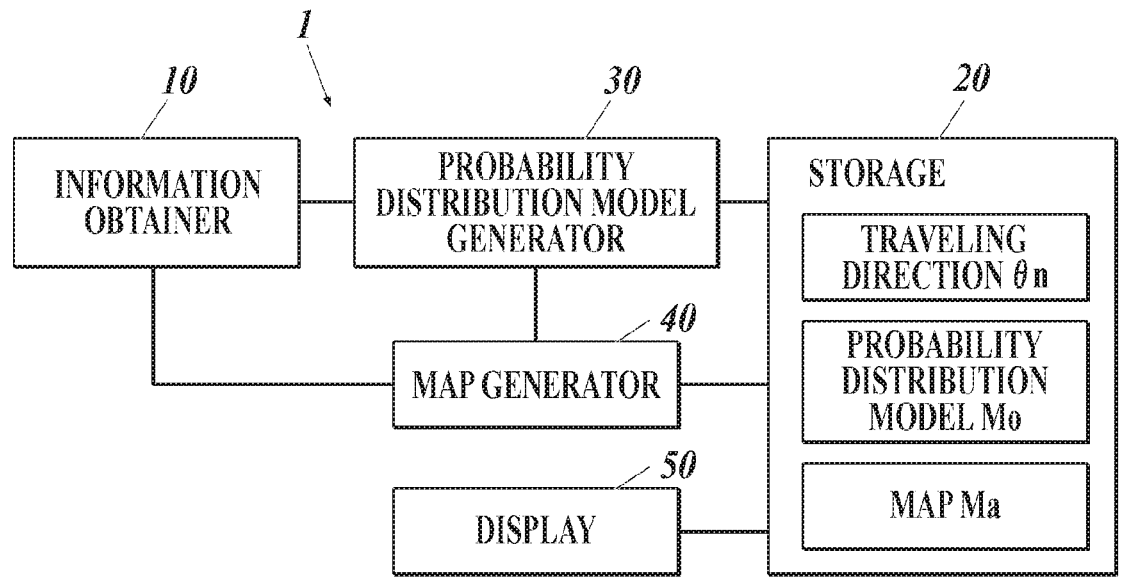
FIG. 1 is a block diagram showing an overall configuration of a behavior prediction system according to the present embodiment.

In order to predict the behavior of a moving object when information on the behavior cannot be (or is not) obtained from the moving object, a human often observes the behavior of the moving object and stochastically predicts the behavior of the moving object that, for example, "the moving object seems to move in this direction" or "the moving object may go there (location)" on the basis of the tendency or pattern of the behavior.

However, it cannot be said at present that there has been established a method in which the behavior prediction system stochastically predicts the behavior of a moving object as automatically as a human does (that is, without human involvement).

It is desirable to provide a behavior prediction system that can provide a material for stochastic prediction of the moving object.

Hereinafter, one or more embodiments of the present disclosure will be described with reference to the drawings. However, the scope of the present disclosure is not limited to the disclosed embodiments. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, it is assumed that the behavior prediction system is mounted on an airplane such as a patrol airplane (including an unmanned airplane and hereinafter also referred to as the system itself) and that the moving object whose behavior is to be predicted is a ship that sails on the sea. However, all the configurations of the behavior prediction system do not have to be installed in a single airplane. Furthermore, the behavior prediction system may not be mounted on an airplane or the like but may be mounted on a ship, a vehicle, or the like. Furthermore, the moving object whose behavior is to be predicted is not limited to a ship, but may be an airplane, a vehicle, a human, or the like. Thus, the present disclosure is not limited to be applied to a case where a behavior prediction system mounted on an airplane predicts the behavior of a ship.

In the following description, a traveling direction θn of the moving object (for example, a ship) is simply expressed by an angle within the range of $-\pi < \theta n \leq \pi$, where 0 represents north, $\pi/2$ represents east, and $-\pi/2$ represents west. That is, in the following description, the processing is performed on the assumption that the moving object travels in a traveling direction θn on a horizontal plane.

Therefore, the probability distribution model Mo and the map Ma described later are generated two-dimensionally. However, if the moving object is an airplane, for example, it is also possible to grasp the traveling direction θn of the moving object in a three-dimensional manner including the vertical direction, and to generate the probability distribution model Mo and the map Ma as three-dimensional ones. The present disclosure also includes such a case.

[Overall Configuration]

FIG. 1 is a block diagram showing the overall configuration of a behavior prediction system 1 according to the present embodiment.

The behavior prediction system 1 includes an information obtainer 10, a storage 20, a probability distribution model generator 30, a map generator 40, and a display 50. The behavior prediction system 1 can be configured by, for example, a computer having a central processing unit (CPU), a read only memory (ROM), a random access memory (RAM), an input/output interface, and the like connected to a bus.

The information obtainer 10 obtains information on the traveling direction θn of a moving object (for example, a ship) whose behavior is to be predicted. Instead of including configurations other than the information obtainer 10 in the system 1, a predetermined communication means may connect the information obtainer 10, the storage 20, the probability distribution model generator 30, the map generator 40, and the display 50 so as to be communicable to one another.

If wireless communication can be performed between the system 1 itself and the moving object, the information obtainer 10 may include a wireless communication module and the like.

Then, if the data on the traveling direction θn can be obtained from the moving object, for example, the information obtainer 10 obtains data from the moving object at predetermined time intervals. In this case, the data itself, which is on the traveling direction θn of the moving object obtained from the moving object, is the information on the traveling direction θn of the moving object.

If position data (for example, data on latitude or longitude) can be obtained from the moving object, for example, the information obtainer 10 obtains the position data from the moving object at predetermined time intervals. In this case, the position data on the moving object obtained from the moving object is the information on the traveling direction θn of the moving object.

In this case, a probability distribution model generator 30 (described later) can calculate displacement of the moving object from the previously obtained position to the currently obtained position, that are obtained by the information obtainer 10, so that the displacement direction can be used as the traveling direction θn of the moving object. The information obtainer 10 may perform the process of calculating the traveling direction θn of the moving object, which may be also applied in the following.

If wireless communication cannot be or is not performed between the system 1 itself and the moving object, the information obtainer 10 may include, for example, a radar, a camera, a sensor, and the like. In this case, the data measured by a radar, a sensor, and the like, or an image taken by a camera and the like is the information on the traveling direction θn of the moving object.

Then, the probability distribution model generator 30 analyzes the data measured by a radar, the image taken by a camera, and the like so as to calculate a distance between the system 1 itself and the moving object, a direction of the moving object, and the like. The position of the moving object is determined from the calculated distance, the calculated direction, the position or the traveling direction of the system 1 itself, and the like. The displacement of the position of the moving object can be calculated in the same manner as above, and the direction of the displacement can be used as the traveling direction θn of the moving object.

The probability distribution model generator 30 may be configured to analyze data measured by the radar, an image taken by the camera, and the like so as to determine the traveling direction θn of the moving object by itself.

The storage 20 stores data on the traveling direction θn of the moving object when the data is transmitted from the information obtainer 10 or the probability distribution model generator 30.

Furthermore, as described below, the storage 20 stores a probability distribution model Mo generated by the probability distribution model generator 30 and a map Ma generated by the map generator 40.

The storage 20 may store the information related to the traveling direction θn of the moving object (that is, the position data on the moving object, the data measured by a radar, the image taken by a camera, and the like) transmitted from the information obtainer 10.

Other than the above, the storage 20 also stores a program for causing the behavior prediction system 1 to perform the behavior prediction process described below, various kinds of data, parameters, and the like.

The display 50 is a display screen or the like which can display the information stored in the storage 20.

Hereinafter, the probability distribution model generator 30 and the map generator 40 is described.

In addition, the action of the behavior prediction system 1 according to the present embodiment will be described.

[Generation of Probability Distribution Model Mo]

The probability distribution model generator 30 generates a probability distribution model Mo related to the traveling direction θn of the moving object based on the information related to the traveling direction θn of the moving object obtained by the information obtainer 10 as described above.

In the present embodiment, the probability distribution model generator 30 generates a probability distribution model Mo every time when the information obtainer 10 obtains information on the traveling direction θn of the moving object as described above. At this time, as described above, the probability distribution model generator 30 calculates the traveling direction θn of the moving object as needed, using the information on the traveling direction θn of the moving object.

In the present embodiment, in generating the probability distribution model Mo based on the data on the traveling direction θn of the moving object, the probability distribution model generator 30 generates the probability distribution model Mo according to directional statistics. In the present embodiment, the probability distribution model generator 30 generates a probability distribution model Mo using the von Mises distribution.

Hereinafter, the probability distribution model generator 30 according to the present embodiment will be described.

As described above, the probability distribution model generator 30 obtains information on the traveling direction θn of the moving object (for example, a ship) from the information obtainer 10, calculates the traveling direction θn of the moving object based on the obtained information, and stores the calculated traveling direction θn in the storage 10.

Hereinafter, it is described that "the traveling direction θn of the moving object is calculated" when the data on the traveling direction θn itself is obtained from the moving object, that is, even when the moving direction θn is not actually calculated.

In the present embodiment, the probability distribution model generator 30 applies the data on the previously calculated traveling direction θn of the moving object read from the storage 20 and the currently calculated data on the traveling direction θn of the moving object to the von Mises distribution represented by the following formula (1). The probability distribution model Mo is then calculated as a probability density function f(θ).

$$f(\theta) = \frac{\exp\{\beta \cos(\theta - \mu)\}}{2\pi I_0(\beta)} \quad (1)$$

-continued $$I_0(\beta) = \frac{1}{2\pi} \int_0^{2\pi} \exp(\beta \cos \theta) d\theta \quad (2)$$

Here, $I_0(\beta)$ is a modified Bessel function of the first kind and zeroth order, and is represented by the above formula (2).

In one example, the currently calculated traveling direction θn of the moving object is used as a reference angle μ in the above formula (1). Therefore, the probability distribution model generator 30 substitutes the currently calculated traveling direction θn of the moving object into the reference angle μ in the formula (1).

Figure 2:
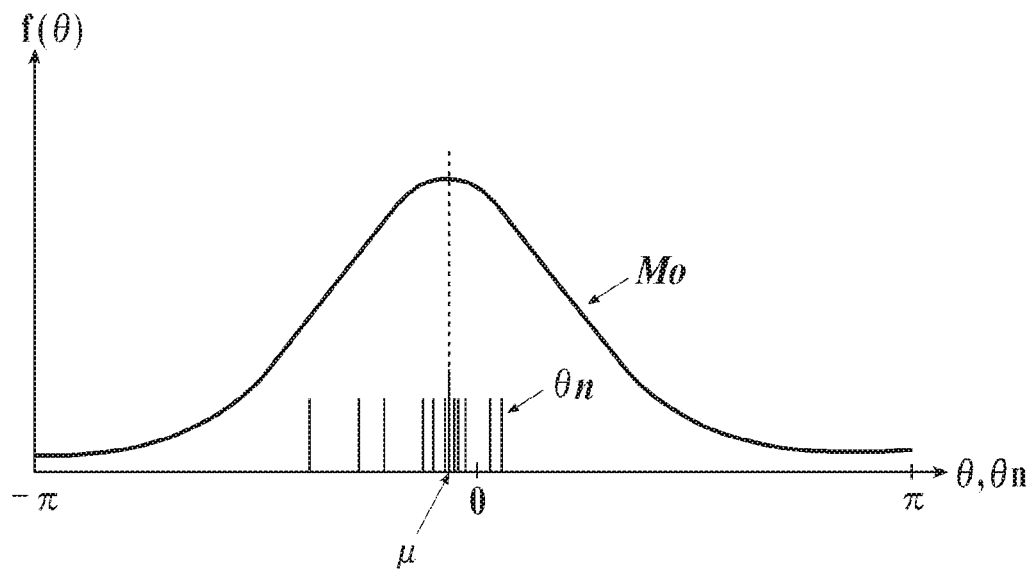
FIG. 2 is a graph showing an example of a probability distribution model or probability density function generated.

As shown in FIG. 2, the data on the traveling directions θn of the moving object calculated so far (see lines extending upward from the horizontal axis of the graph) is used to define the spread of data distribution. The value of the parameter β is adjusted such that the spread of data distribution matches the spread of the data on the traveling directions θn of the moving object calculated so far.

The probability density function f(θ) is thus determined, and the probability distribution model Mo is generated. According to FIG. 2, the currently calculated traveling direction θn (that is, the reference angle μ) of the moving object is slightly westward (θ is a slightly negative value) than true north (θ=0).

Figure 3A:
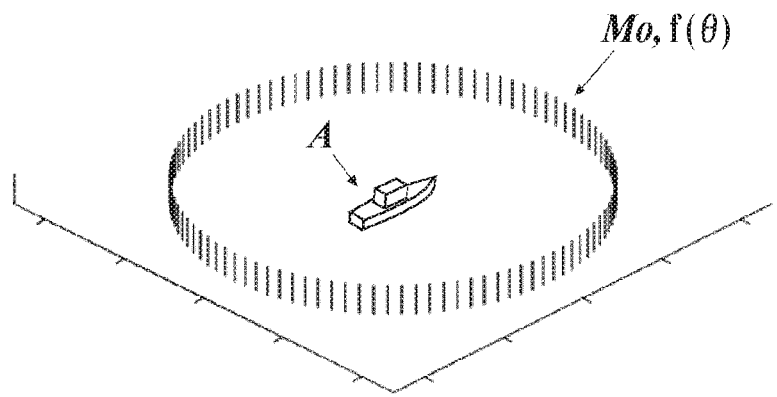
FIG. 3A shows an example of a probability distribution model having a uniform distribution.

With such a configuration, since there is no data on the traveling direction θn in the initial state before calculating the traveling direction θn of the moving object, the probability distribution model Mo (that is, the probability density function f(θ)) represents uniform distribution for each probability variable θ (that is, the traveling direction θn of the moving object), for example, as shown in FIG. 3A.

Figure 3B:
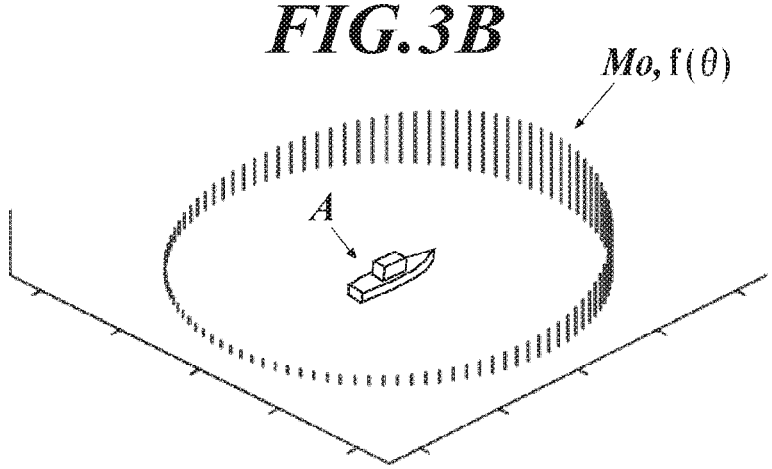
FIG. 3B shows an example of a probability distribution model having a wide distribution with a low peak.
Figure 3C:
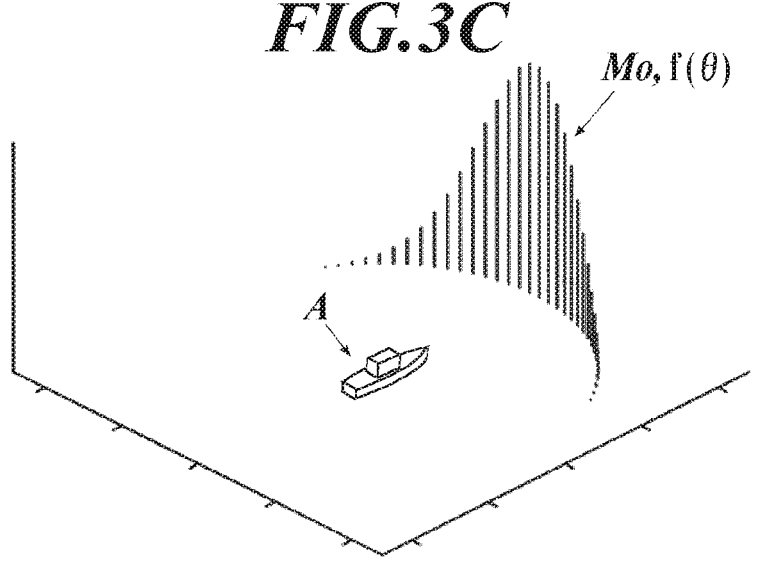
FIG. 3C shows an example of a probability distribution model having a narrow distribution with a high peak.

In FIGS. 3A and 3B to 3C described later, upward bars are illustrated on a circumference with the moving object A (for example, a ship) as a center. The lengths of the respective bars each represent a value of f(θ) for a corresponding probability variable θ in the probability distribution model Mo (the probability density function f(θ)).

Then, as the traveling direction θn of the moving object A is calculated, in the probability distribution model Mo (the probability density function f(θ)), values of f(θ) uniformly distributed for all probability variables θ (see FIG. 3A) change to have gentle slopes that form a peak at the currently calculated traveling direction θn (that is, the currently traveling direction θn of the moving object A) (see FIG. 3B).

If the traveling direction θ of the moving object A greatly fluctuates because, for example, the moving object A is a suspicious ship that escapes while changing the traveling direction to the left and right, the calculated traveling direction θ of the moving object A spreads widely, and the probability distribution model Mo (that is, the probability density function f(θ)) also widely spreads (for example, the half width becomes large) as shown in FIG. 3B.

If the traveling direction θn of the moving object A is a predetermined direction because, for example, the moving object A is traveling straight in a certain direction, the calculated traveling direction θ of the moving object A is almost the same as or close to the predetermined direction (predetermined θ), and the calculated traveling direction θ spreads narrowly.

Therefore, in this case, as shown in FIG. 3C, the probability distribution model Mo (that is, the probability density function f(θ)) has a higher peak and a narrower distribution.

As described above, the probability distribution model generator 30 calculates the traveling direction θn of the moving object A based on the information on the traveling direction θn of the moving object A, and performs statistical processing on the calculated traveling direction θn of the moving object A to generate a probability distribution model Mo related to the traveling direction θn of the moving object A.

The probability distribution model Mo thus generated corresponds to a stochastic prediction result of the moving direction of the moving object A by a human on the basis of the tendency and pattern of the movement (here, the navigation status of the ship) of the moving object A.

That is, for example, if the traveling direction θn of the moving object A has been constant, a human observes it and predicts that "the moving object A is currently traveling in the direction of xxx, and it is highly possible that it continues traveling in this direction."

In the same situation, the probability distribution model Mo has a high peak in the traveling direction θn and a narrow distribution as shown in FIG. 3C.

As described above, a high peak or a narrow distribution (for example, half width) of a peak in the probability distribution model Mo represents a situation which is to happen with high probability according to prediction by a human.

If the traveling direction θn fluctuates because, for example, the moving object A escapes while turning to the left and right, the human observes it and predicts that "the moving object A is currently traveling in the direction of xxx, but there is a low probability that it continues traveling in that direction."

In the same situation, the probability distribution model Mo has a low peak (in the current traveling direction θn) and a wide distribution as shown in FIG. 3B.

As described above, the low peak or the wide distribution of the probability distribution model Mo represents a situation which is to happen with low probability according to prediction by a human.

Modification Regarding Generation of Probability Distribution Model Mo

Modified Example 1

When the moving object A traveling in the north direction (θn=0) changes the traveling direction θn to the northeast direction (θn=π/4) and continues to travel in the northeast direction after that, and if the probability distribution model Mo is generated on the basis of the data on the traveling direction θn of the moving object A including past old data, the probability distribution model Mo may not be able to reflect the current traveling situation of the moving object A.

That is, in the above case, the traveling direction θn of the moving object A may return to the north direction immediately after the traveling direction θn of the moving object A changes to the northeast direction. Therefore, the probability distribution model Mo may be generated on the basis of the data on the traveling direction θn of the moving object A including the data on the traveling direction θn of the moving object A when the moving object A was traveling in the north direction (θn=0).

However, when the traveling direction θn of the moving object A changes to the northeast direction and remains to be the northeast direction for some time, the human observes it and predicts that "the moving object A is currently traveling in the northeast direction, and it is highly possible that it continues traveling in that direction." Therefore, in such a situation, the probability distribution model Mo should have distribution with a high peak in the northeast direction (θn=π/4) and a narrow width (see FIG. 3C).

However, if the probability distribution model Mo is generated based on the data on the traveling direction θn of the moving object A including the data during travel in the north direction (the traveling direction θn=0) even after the traveling direction θn has changed to the northeast direction, the data during travel in the north direction hinders narrow distribution of the probability distribution model Mo (probability density function f(θ)). As a result, the probability distribution model Mo may have a peak in the northeast direction (θn=π/4), but the peak may be low and spread widely (see FIG. 3B). In such a case, the probability distribution model Mo does not correspond to the above-described human prediction, that is, the prediction that "it is highly possible that the moving object A continues traveling in the northeast direction."

Therefore, in the present embodiment, the probability distribution model generator 30 generates the probability distribution model Mo as described above, based on the data on the predetermined number of the latest travel directions θn, including the data on the lastly calculated traveling direction θn of the moving object A (currently calculated data) on the basis of the information on the traveling direction θn of the moving object A obtained by the information obtainer 10.

In this case, each time the traveling direction θn of the moving object A is calculated, the probability distribution model generator 30 discards the oldest data on the calculated traveling direction θn (or does not use the oldest data in generating the probability distribution model Mo). As a result, the probability distribution model Mo is always generated only based on the data on a predetermined number of traveling directions θn, which includes the data on the latest traveling direction θn.

In such configuration, when the moving object A changes its traveling direction θn as described above, the old data before the changing of the traveling direction θn is gradually not used to generate the probability distribution model Mo.

Therefore, the generated probability distribution model Mo more accurately corresponds to the stochastic prediction result of the moving direction of the moving object A by a human based on the tendency and pattern of the movement of the moving object A (here, the navigation status of the ship as the moving object A).

Modified Example 2

If the moving object A turns sharply and changes its traveling direction θn largely, the probability distribution model Mo may be able to reflect the movement of the moving object A (moving object) more accurately by using a newly generated probability distribution model Mo based on the data on the traveling direction θn calculated only after the moving object A changed the tendency of its traveling direction θn, rather than by persistently using the data calculated before the change.

For example, when the moving object A (moving object) changes the tendency of its traveling direction θn largely, the probability distribution model generator 30 may be configured to reset (discard) the data on the traveling direction θn of the moving object A calculated on the basis of the information on the traveling direction θn so far, and generate the probability distribution model Mo on the basis of the newly calculated data on the traveling direction θn of the moving object A only after the tendency changes.

In this case, a threshold value indicating large change in tendency of the traveling direction θn of the moving object A is set to be 2σ (twice the standard deviation σ), for example.

That is, for example, when the absolute value of the difference between the currently calculated traveling direction θn_new of the moving object A and the previously calculated traveling direction θn_old of the moving object A is more than twice the standard deviation σ of the previously generated probability distribution model Mo (probability density function f(θ)) (i.e., when the value |θn_new−θn_old| is 2σ or more), the data on the traveling direction θn of the moving object A is reset as described above, and then the probability distribution model Mo is generated based on the data on the newly calculated traveling direction(s) θn of the moving object A only.

[Generation of Probability Distribution Model Mo]

Next, a map generation process by the map generator 40 (See FIG. 1) according to the present embodiment will be described.

The map generator 40 uses the probability distribution model Mo (probability density function f(θ)) generated by the probability distribution model generator 30 described above, to calculate probabilities that the moving object A passes through the respective areas into which the movable region of the moving object A is divided, and to generate a probability map Ma (hereinafter, simply referred to as a map Ma) in which the probabilities are assigned to the respective areas r.

As described above, the probability distribution model Mo (probability density function f(θ)) is a stochastically predicted moving direction of the moving object A based on the tendency or pattern of the movement of the moving object A, and is used to generate the map Ma.

Therefore, based on the assumption that the moving object A continues to move according to the tendency or pattern of the current movement, the probabilities that the moving object A passes through the respective areas are calculated, and are assigned to the respective areas in the map Ma.

As described later, the map Ma actually has cells corresponding to the respective areas of the movable region of the moving object A. The calculated probabilities of passing through the respective areas are assigned to the respective cells corresponding to the respective areas.

[Configuration of Map and the Like]

In the followings, the generation of the map Ma by the map generator 40 will be described.

When the moving object A is a ship, for example, the movable region of the moving object A extends over the entire area of the sea and the like. However, the information on the traveling direction θn of the moving object A can be obtained only when the moving object A is within a range where radar from an airplane such as a patrol airplane reaches, for example.

In other words, if the moving object A is outside the reach a radar from an airplane such as a patrol airplane, information on the traveling direction θn of the moving object A cannot be obtained and the behavior of the moving object A cannot be predicted. Therefore, the movable region R of the moving object A (hereinafter referred to as a movable region R) is defined as the region where the radar from the airplane such as the patrol airplane reaches.

Figure 4A:
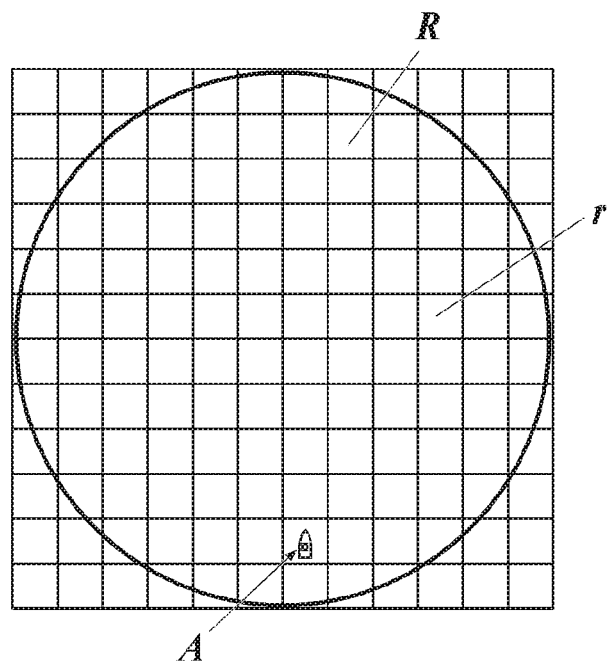
FIG. 4A is a view of a movable region of the moving object viewed from above.

When the movable region R of the moving object A is viewed from above (from the side of the airplane such as the patrol airplane), it is a circular region in which an airplane (not shown) is centered as shown in FIG. 4A.

Then, as shown in FIG. 4A, the movable region R of the moving object A is divided into areas r, for example, in a grid shape.

Figure 4B:
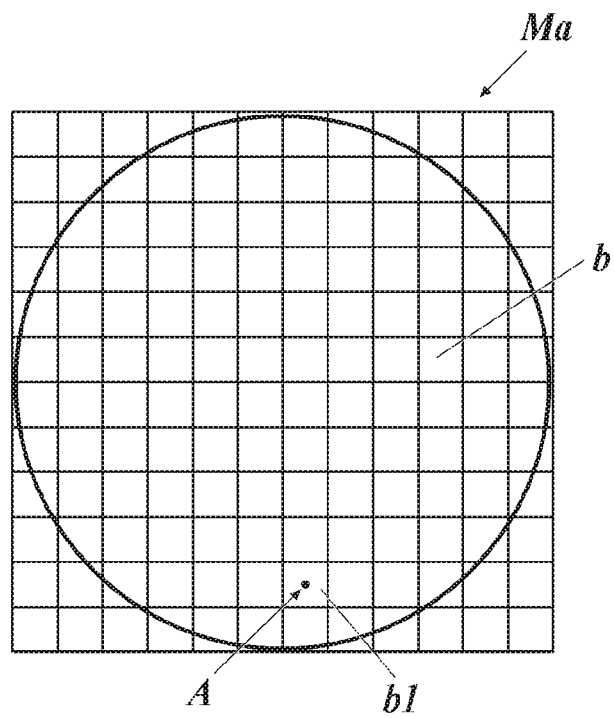
FIG. 4B is a view showing an example of a map.

The map generator 40 has a map Ma of the same shape as the movable region R. That is, as shown in FIG. 4B, the map generator 40 has a map Ma in which a circular region is divided into cells b, in a grid shape.

The cells b in the map Ma correspond to the respective areas r in the movable region R of the moving object A.

In the following description, the areas r in the movable region R and the cells b in the map Ma corresponding to the respective areas r may be similarly described. For example, the description that "the moving object A is in the cell b" actually means that "the moving object A is in an area r in the movable region R corresponding to the cell b in the map Ma."

Hereinafter, the cell b in which the moving object A currently exists is referred to as a cell b1 (see FIG. 4B).

[Generation of Map with Dynamic Programming]

In the present embodiment, the map generator 40 calculates for the respective areas r (that is, for the respective cells b in the map Ma) the probabilities that the moving object A passes through the areas r (the cells b) by the dynamic programming method.

Dynamic programming can be defined in various ways, but is in principle a method where a problem (an entire problem) is divided into a plurality of subproblems, and is solved by solving a subproblem(s) using a result(s) of solving another subproblem(s).

In the present embodiment, a subproblem is to calculate a local movement probability of the moving object A in a certain direction, and the map generator 40 repeatedly calculates the local movement probability so as to calculate the probability that the moving object A passes through the respective areas r in the movable region R (cells b in the map Ma).

As described above, the "local movement probability of the moving object A in a certain direction" is calculated using the probability distribution model Mo (probability density function f(θ)) generated by the probability distribution model generator 30 not as it is, but in "consideration of all situations" as if a human makes prediction.

In the present embodiment, the map generator 40 uses the following formula (3) to calculate the probability $Pr(B_i|b_{0:i-1})$ that the moving object A moves locally in a certain direction.

$$Pr(B_i \mid b_{0:i-1}) = \sum_{\theta m \in \Theta} Pr(B_i \mid b_{i-1}, \theta m) \times Pr(b_{0:i-1}) \quad (3)$$

Here, "i" represents iteration number in repeated calculations.

$Pr(B_i|b_{0:i-1})$ on the left side of the formula (3) represents a probability that the moving object A having moved from the current cell b1 (from 0th iteration) to the cell bit in the (i−1)th iteration moves to the cell $B_i$ in the next one iteration (that is, in the i-th iteration).

Further, roughly explaining the right side of the formula (3), $Pr(b_{0:i-1})$ corresponds to the "probability that the moving object A moves from the current cell b1 to the cell bit $b_{i-1}$ in the (i−1)th iteration," and $\Sigma Pr(B_i|b_{i-1}, \theta m)$ corresponds to the "probability that the moving object A in cell $b_{i-1}$ moves to the cell $B_i$ in the next one iteration." $Pr(b_{0:i-1})$ and the calculated $Pr(B_i|b_{0:i-1})$ will be described later.

The formula (3) will be described in detail below.

First, if the moving object A is set to move one cell in one iteration, the "cell $B_i$" in the formula (3), to which the moving object A can move from the cell $b_{i-1}$ in the next one iteration, is either one of the eight cells bA to bH adjacent to the cell $B_{i-1}$ (see FIG. 5A). In this case, the "$B_i$" in $Pr(B_i|b_{0:i-1})$ represents these eight cells (that is, bA to bH), and the $Pr(B_i|b_{0:i-1})$ represents eight probabilities (that is, $Pr(bA|b_{0:i-1})$, $Pr(bB|b_{0:i-1})$, ..., and $Pr(bH|b_{0:i-1})$) with one expression.

In the following, the moving object A is assumed to move one cell in one iteration. If the moving object A can move two cells (or less) in one iteration, as shown in FIG. 5B, the cell $B_i$ to which the moving object A can move in the next one iteration is either one of 24 cells (bA to bX) around the cell $B_{i-1}$.

Thus, if the moving object A is allowed to move k cells in one iteration, the cell $B_i$ to which the moving object A can move in the next one iteration is either one of $\{(2k+1)^2-1\}$ cells around the cell $B_{i-1}$.

Figure 6A:
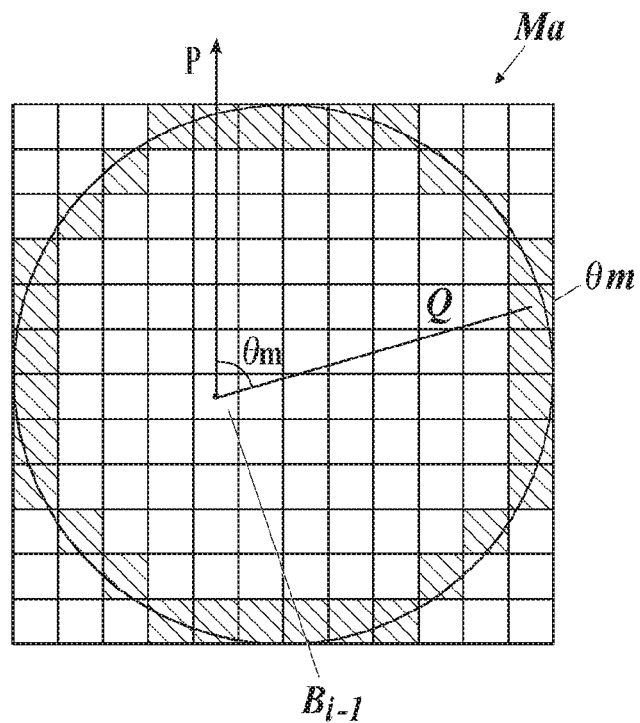
FIG. 6A is a diagram for explaining θm and the like in formula (3)

Next, as shown in FIG. 6A, the "θm" in the right side of the formula (3) represents the angle of a line Q with respect to a reference line P (a line toward due north in this case, extending upward from the center of the cell $B_{i-1}$ in FIG. 6A). The line Q connects the center of the cell and the center of each of the cells (the shaded cells in FIG. 6A) through which a circle (corresponding to a circle representing the outline of the movable region R of the moving object A (see FIG. 4A), hereinafter referred to as an outline circle) representing the outline of the map Ma pass.

The cell on the outline circle in the map Ma corresponding to the above-defined angle θm will be hereinafter abbreviated as a cell θm. "Θ" in the right side of the formula (3) represents set of the θm.

Figure 6B:
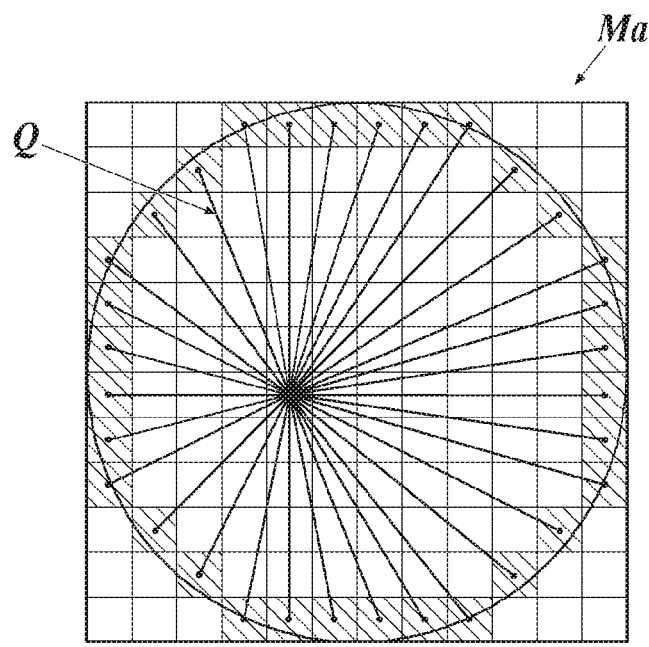
FIG. 6B is a diagram illustrating lines connecting the cell $b_{i-1}$ and the centers of the cells on an outline circle.

Because there are 32 cells θm on the outline circle in FIG. 6A, there are 32 lines Q connecting the center of the cell $B_{i-1}$ and the center of the respective cells θm as shown in FIG. 6B. Therefore, there are 32 values of θm (θ1 to θ32), and the sum (Σ) in the right sides of the formula (3) is calculated for the 32 values of θm in this case.

The smaller the respective areas r into which the movable region is divided (in other words, the respective cells b in the map Ma corresponding to the areas r) are, the more the number of cells θm. Instead of sum for θm as discrete values, integration for θm may be calculated assuming that the θm is a continuous value.

However, the amount and load of the calculation can be reduced when the sum of θm as discrete values is calculated, rather than integration of θm as a continuous value. It is also possible to generate a sufficiently effective map Ma even by calculating the sum of θm as discrete values.

Next, $\Sigma Pr(B_i|b_{i-1}, \theta m)$ on the right side of the formula (3) will be described.

In the present embodiment, $Pr(B_i|b_{i-1}, \theta m)$ represents "the probability that the moving object A moves from the cell $b_{i-1}$ to the cell $B_i$ in the next one iteration during movement from the cell $b_{i-1}$ to the cell θm (that is, during movement in the direction of angle θm)" and is calculated according to the following formula (4).

$$Pr(B_i|b_{i-1},\theta m)=K^{-1}\exp[-\alpha(\delta(b_{i-1},B_i,\theta m)-\delta(b_{i-1},\theta m))]\times f(\theta m) \quad (4)$$

Figure 7:
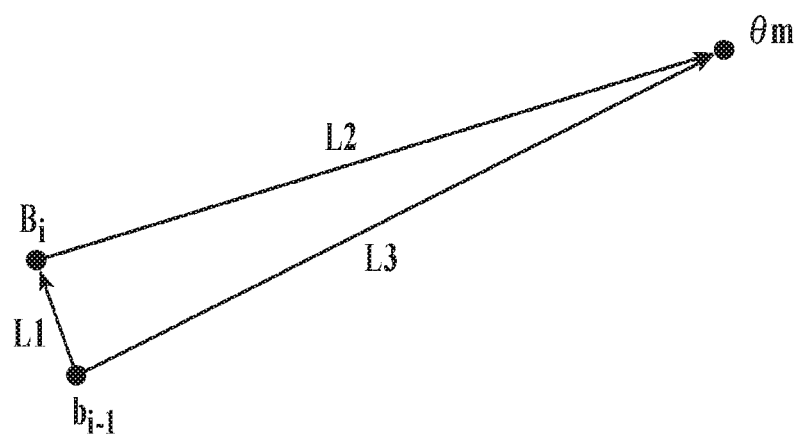
FIG. 7 is a diagram for explaining $\delta(b_{i-1}, B_i, \theta m)$ and $\delta(b_{i-1}, \theta m)$ in formula (4)

As simply illustrated in FIG. 7, $\delta(b_{i-1}, B_i, \theta m)$ in the formula (4) represents the moving distance of the moving object A from the cell $b_{i-1}$ to the cell θm through the cell $B_i$. It is calculated as the sum of L1 and L2 in FIG. 7, respectively representing the distance between the center of the cell $b_{i-1}$ and the center of the cell $B_i$ and the distance between the center of the cell $B_i$ and the center of the cell θm.

$\delta(b_{i-1}, \theta m)$ represents L3 in FIG. 7, representing the distance between the center of the cell $b_{i-1}$ and the center of the cell θm, and is the shortest distance between the cell and the cell θm. In the formula (4), K is a coefficient for obtaining an average, and f(θ) is a probability distribution model Mo (the probability density function) generated by the probability distribution model generator 30 described above.

Here, $\delta(b_{i-1}, B_i, \theta m) - \delta(b_{i-1}, \theta m)$ is 0 or a positive value because the distance $\delta(b_{i-1}, B_i, \theta m)$ cannot be shorter than the shortest distance $\delta(b_{i-1}, \theta m)$. The coefficient α is set to be a positive value.

Therefore, the value of $\exp[-\alpha(\delta(b_{i-1}, B_i, \theta m) - \delta(b_{i-1}, \theta m))]$ becomes larger as the distance $\delta(b_{i-1}, B_i, \theta m)$ is closer to the shortest distance $\delta(b_{i-1}, \theta m)$, and becomes smaller as the difference between the distance $\delta(b_{i-1}, B_i, \theta m)$ and the shortest distance $\delta(b_{i-1}, \theta m)$ becomes larger.

That is, $\exp[-\alpha(\delta(b_{i-1}, B_i, \theta m) - \delta(b_{i-1}, \theta m))]$ in the formula (4) indicates the followings, when the moving object A in the cell $b_{i-1}$ moves to the cell $B_i$ in the next one iteration (that is, in the i-th iteration) during movement from the cell $b_{i-1}$ to the cell θm. The closer the cell $B_i$ is to the path of the shortest distance $\delta(b_{i-1}, \theta m)$, the larger the probability that the moving object A moves to the cell $B_i$ is. To the contrary, the farther the cell $B_i$ is from the path of the shortest distance δ ($b_{i-1}$, θm), the smaller the probability that the moving object A moves to the cell $B_i$ is.

This corresponds to the human prediction that, when the moving object A moving toward the cell θm moves from the cell $b_{i-1}$ to the cell $B_i$ in the next one iteration, it is more likely to go straight toward the cell θm than to go around, that is, in a direction not toward the cell θm.

Further, in the first place, the probability distribution model generator 30 provides the probability of traveling toward the cell θm as the above-described probability distribution model Mo, that is, the probability density function f(θ).

Therefore, in the formula (4), $Pr(B_i|b_{i-1}, \theta m)$ is calculated by multiplying the above-calculated $\exp[-\alpha(\delta(b_{i-1}, B_i, \theta m) - \delta(b_{i-1}, \theta m))]$ by f(θm).

In this way, according to the formula (3), $Pr(B_i|b_{i-1}, \theta m)$ is calculated for all possible values of θm (32 values in the case of FIGS. 6A and 6B), and then summed up. Then, "the probability that the moving object A moves from the cell $b_{i-1}$ to the cell $B_i$ in the next one iteration" is calculated (see the term $\Sigma Pr(B_i|b_{i-1}, \theta m)$ in the right side of the formula (3)).

Considering all possible values of θm in this way corresponds to "consideration of all situations" in human prediction, as described above.

Next, $Pr(b_{0:i-1})$ on the right side of the formula (3) will be described.

The moving object A does not always (that is, with the probability of 100%) move from the current cell b1 (see FIG. 4B) to the cell in the (i−1)th iteration. Therefore, it is necessary to also consider the probability that the moving object A moves from the current cell b1 to the cell b±1 in the (i−1)th iteration to achieve the final object of calculating probabilities for the respective cells (for the respective areas) that the moving object A passes through the respective cells b in the map Ma (that is, the respective areas r in the movable region R).

This is represented by $Pr(b_{0:i-1})$ on the right side of the formula (3). $Pr(b_{0:i-1})$ means "the probability that the moving object A moves from the current cell b1 (in the 0th iteration) to the cell (in the (i−1)th iteration)."

In the following, a specific form of $Pr(b_{0:i-1})$ in the formula (3) and a method for calculating the probability that the moving object A passes through the respective cells b in the map Ma (that is, the respective areas r in the movable region R) will be described.

As described above, in the present embodiment, the map generator 40 repeatedly calculates the local movement probability of the moving object A in a certain direction (that is, $Pr(B_i|b_{i-1\_})$ on the left side of the formula (3)) as the above-described subproblems, using the dynamic programming method. The probabilities of the moving object A passing through the respective areas r in the movable area R (the respective cells b in the map Ma) are thus calculated.

Figure 8A:
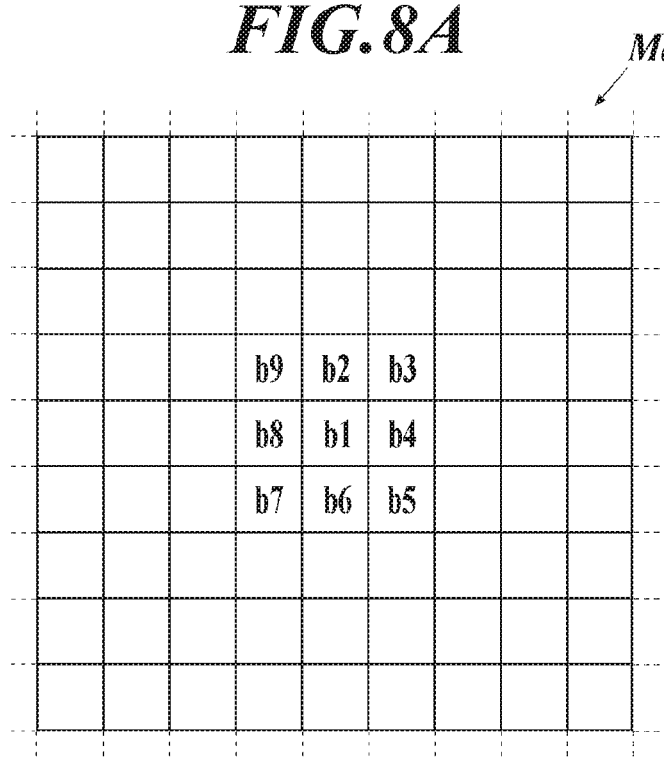
FIG. 8A is a diagram for explaining the first iteration, in which probabilities that the moving object moves from the current cell to either of eight adjacent cells are calculated.

In the present embodiment, the probabilities that the moving object A moves from the current cell b1 to the respective eight adjacent cells b2 to b9 (see FIG. 8A) in the first iteration are calculated, and the probabilities that the moving object A in the respective cells b2 to b9 after movement in the first iteration moves to the outwardly adjacent sixteen cells b10 to b25 (see FIG. 8B) are each calculated in the second iteration.

In the present embodiment, the probability is calculated while the moving object A is moved to an outwardly adjacent cell at each iteration, such that the probability is calculated for all the cells in the map Ma.

The following is a detailed explanation.

First, the map generator 40 calculates the probabilities that the moving object A at the current cell b1 moves to each of the eight cells b2 to b9 (see FIG. 8A) adjacent to the current cell b1 in the first iteration.

For example, when the probability that the moving object A moves from the current cell b1 to the cell b2 in the first iteration is calculated, in the above formulas (3) and (4), $B_i$ is defined to be b2, $b_{i-1}$ is defined to be b1, and is defined to be $b_{0:0}$ since i=1 in the first iteration.

In this case, the left side of the formula (3) is $Pr(b2|b_{0:0})$, which represents, according to simple application of i=1 in the above definition, the probability that the moving object A moves from the current cell b1 to the cell b1 (corresponding to $b_{i-1}$) in the 0th iteration (corresponding to (i−1)th iteration) and moves to the cell b2 in the next one iteration.

That is, $Pr(b2|b_{0:0})$ represents the probability that the moving object A in the current cell b1 in the 0th iteration moves to the cell b2 in the next one iteration (that is, in the first iteration).

In this case, $Pr(b_{0:i-1})$ on the right side of the formula (3) is $Pr(b_{0:0})$, which means the probability that the moving object A moves from the current cell b1 to the cell b1 (that is, the current cell b1) at the 0th iteration. This represents the probability that the moving object A is in the current cell b1 at the 0th iteration as described above. Since the moving object A is in the current cell b1 at the 0th iteration (that is, before starting the repeated calculations), $Pr(b_{0:0})$ is 1 (=100%).

The same applies to the probability calculation that the moving object A moves from the current cell b1 each of the other cells b3 to b9 in the first iteration is calculated, and $Pr(b_{0:0})$ is 1.

When the moving object A moves from the current cell b1 to the cell b2 in the first iteration, the term including on the right side of the formula (3) is $\Sigma Pr(b2|b1, \theta m)$. This is calculated using the formula (4) for each $\theta m$ with $B_i$ fixed to b2 and $b_{i-1}$ fixed to b1, and adding the calculation results for all the $\theta m$.

As described above, since $Pr(b_{0:0})$ is 1 in this case, $\Sigma Pr(b2|b1, \theta m)$ is determined to be $Pr(b2|b_{0:0})$, that is, the probability that the moving object A moves from the current cell b1 to the cell b2 in the first iteration.

The map generator 40 performs the above calculation for each of the cells b2 to b9, and obtains the probabilities $Pr(b9|b_{0:0})$ to $Pr(b2|b_{0:0})$ that the moving object A moves from the current cell b1 to the respective cells b2 to b9 in the first iteration.

The calculated probabilities $Pr(b2|b_{0:0})$ to $Pr(b9|b_{0:0})$ are each stored in the memory at a region corresponding to the each of the cells b2 to b9.

Figure 8B:
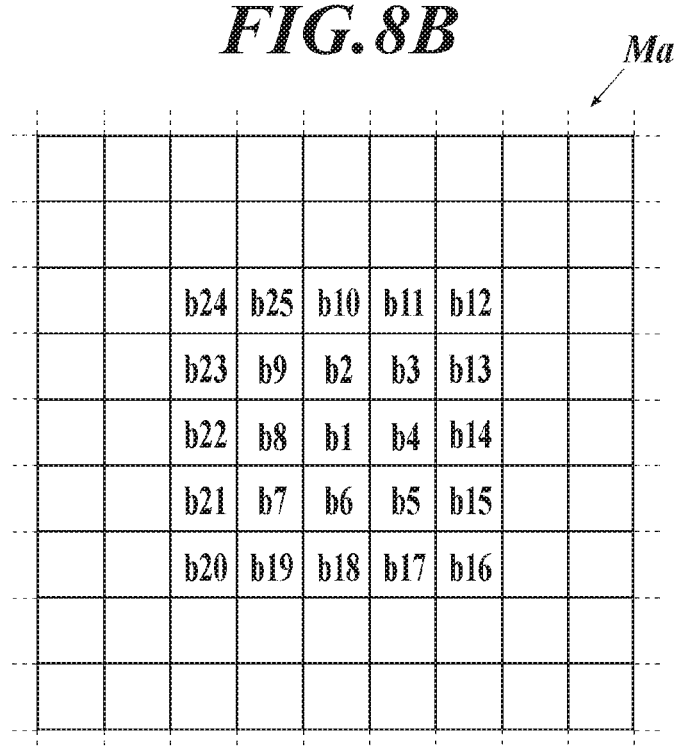
FIG. 8B is a diagram for explaining the second iteration, in which the probabilities that the moving object after the first iteration further moves to outwardly adjacent cells are calculated.

Subsequently, the map generator 40 calculates the probabilities that the moving object A moves, in the second iteration, to the respective eight cells b adjacent to the each of the cells b2 to b9 to which the moving object A has moved in the first iteration (see FIG. 8B)

As described above, in the present embodiment, the moving object A is set to move one cell in one iteration. Therefore, in the second iteration, the probability is calculated in moving from each of the cells b2 and the like to the respective eight cells b adjacent thereto.

Figure 9A:
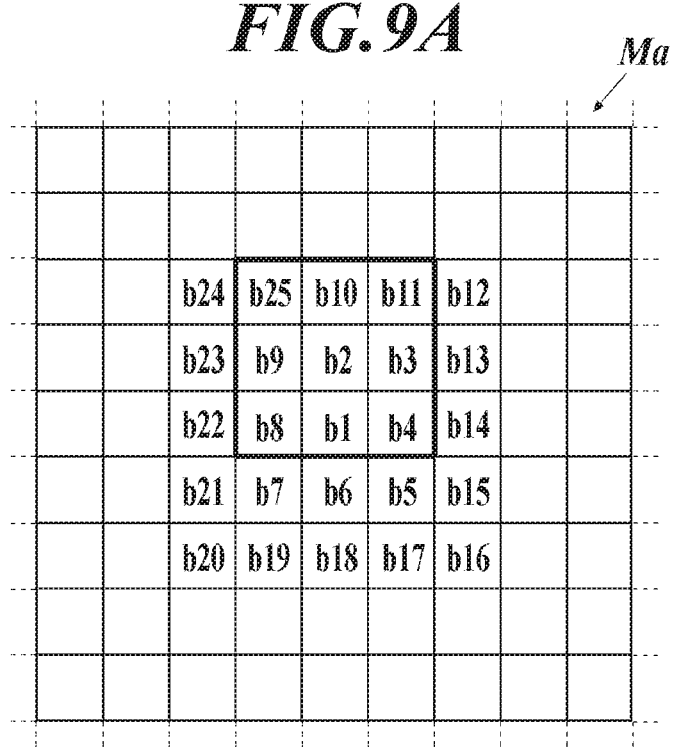
FIG. 9A is a diagram for explaining cells adjacent to cell b2.
Figure 9B:
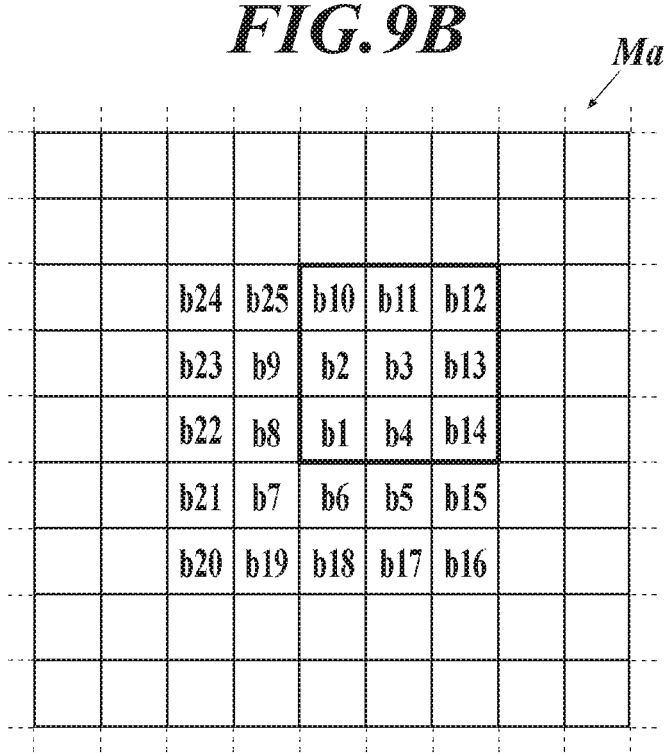
FIG. 9B is a diagram for explaining cells adjacent to cell b3.

That is, the map generator 40 calculates the probability that the moving object A in the cell b2 moves, in the second iteration, to each of the adjacent cells b10, b11, b3, b4, b1, b8, b9, and b25 (see FIG. 8B) as shown in FIG. 9A, and then calculates the probability that the moving object A in the cell b3 moves to each of the adjacent cells b11, b12, b13, b14, b4, b1, b2, and b10 as shown in FIG. 9B.

The same calculation is performed for each of the cells b4 to b9.

Then, for example, as shown in FIG. 9A, in calculation of the probability that the moving object A having moved to the cell b2 in iteration 1 moves to each of the eight cells b (cells b10, b11, b3, b4, b1, b8, b9, and b25) adjacent to the cell b2, $\Sigma Pr(b2|b1, \theta m)$ on the right side of the formula (3) can be calculated using the formula (4) in the same manner as in the case of the above-described iteration 1.

In this case, in the calculation of the second iteration, is defined to be b2, and $B_i$ is defined to be b10, b11, b3, b4, b1, b8, b9, and b25.

Then, for example, in calculation of the probability that the moving object A moves from the cell b2 to the cell b10, $\Sigma Pr(B_i|b_{i-1}, \theta m)$ is calculated in the same manner as in the above-described first iteration, with $b_{i-1}$ fixed to b2 and $B_i$ fixed to b10.

In the second iteration (i=2), $Pr(b_{0:i-1})$ on the right side of the formula (3) is $Pr(b_{0:1})$ and means that "the probability that the moving object A moves from the current cell b1 to the cell bit $b_{i-1}$ (cell b2 here) in the first iteration." The probability is equal to the probability $Pr(b2|b_{0:0})$ which has already been calculated in the first iteration and stored in the memory, because there is only one path (b1→b2) for the moving object A to move from the cell b1 to the cell b2 in the first iteration.

Therefore, according to the formula (3), the map generator 40 multiplies the calculated $\Sigma Pr(B_i|b_{i-1}, \theta m)$ by the $Pr(b2|b_{0:0})$ read from the memory to calculate the probability $Pr(b10|b_{0:1})$ (provided that $b_{i-1}$ is b2) that the moving object A moves from the cell b2 to the cell b10 in the second iteration. Hereinafter, $Pr(b10|b_{0:1})$ (provided that $b_{i-1}$ is b2) will be referred to as "$Pr(b10|b_{0:1})$ (where is b2)."

The calculated probability $Pr(b10|b_{0:1})$ (where $b_{i-1}$ is b2) is stored in the memory at the region corresponding to the cell b10.

The map generator 40 similarly calculates the probabilities that the moving object A moves from the cell b2 to each of the other seven cells b11, b3, b4, b1, b8, b9, and b25.

Then, the calculated probabilities $Pr(b11|b_{0:1})$ (where $b_{i-1}$ is b2), $Pr(b3|b_{0:1})$ (where $b_{i-1}$ is b2), . . . , and $Pr(b25|b_{0:1})$ (where $b_{i-1}$ is b2) are each stored in the memory at the region corresponding to each of the cells b11, b3, b4, b1, b8, b9, and b25.

Then, the map generator 40 performs the same calculation for each of the other cells b3 to b9 to which the moving object A has moved in the first iteration as the calculation for the cell b2, and stores the calculated probabilities in the memory at the respective regions.

In the present embodiment, the map generator 40 calculates these probabilities while the moving object A is moved at each iteration outward from the current cell b1, and stores the calculated probabilities in the respective regions in the memory.

Figure 10A:
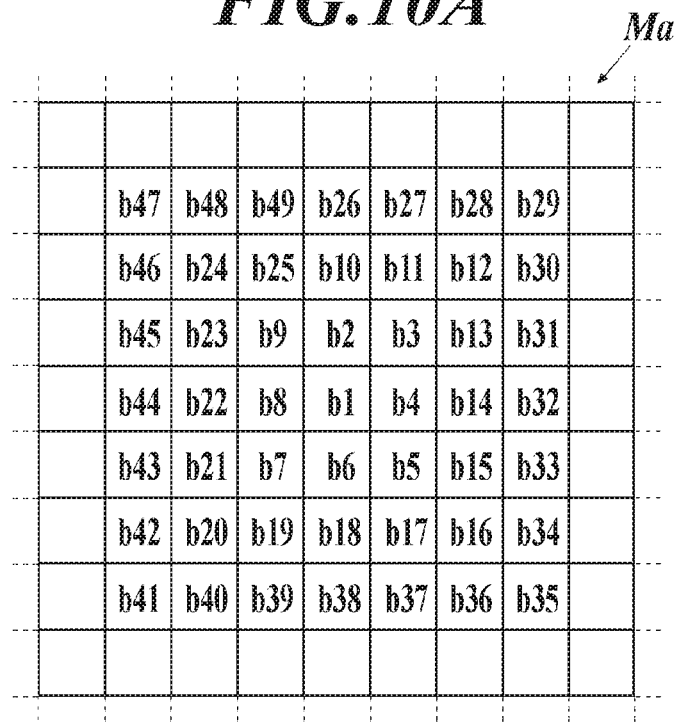
FIG. 10A is a diagram illustrating a cell to which the moving object moves in the third iteration.

In this case, when the probability that the moving object A having moved to the cell b10 in the second iteration moves to each of the eight adjacent cells b26, b27, b11, b3, b2, b9, b25, and b49 (see FIG. 10A) in the third iteration is calculated, for example, $Pr(b_{0:i-1})$ on the right side of the formula (3) is $Pr(b_{0:2})$ because i is 3, which means that "the probability that the moving object A moves from the current cell b1 to the cell b10 in the third iteration."

Figure 10B:
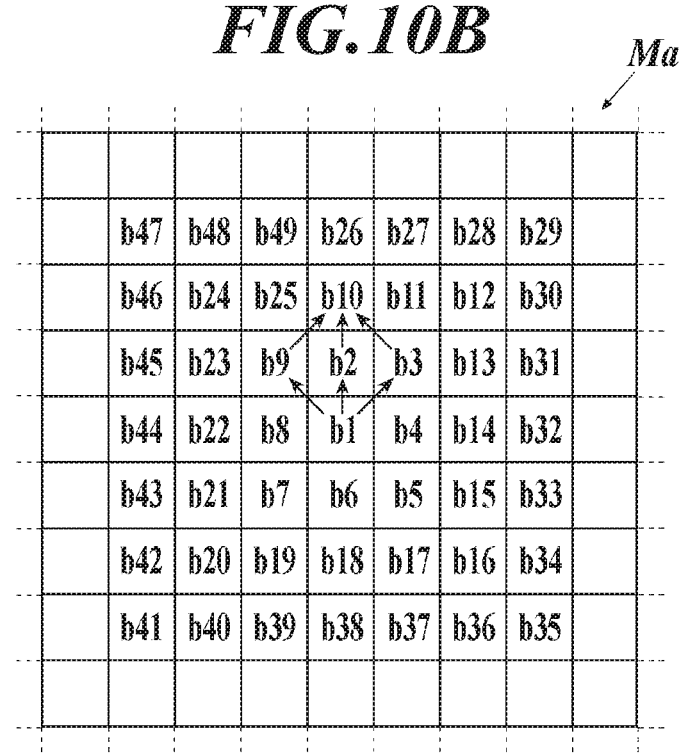
FIG. 10B is a diagram for explaining a path of the moving object from the cell b1 to the cell b10.

As shown in FIG. 10B, the path along which the moving object A moves from the current cell b1 to the cell b10 in the third iteration includes not only the path b1→b2→b10 but also the path b1→b3→b10 but the path b1→b9→b10.

Therefore, in the present embodiment, for example, $Pr(b_{0:2})$ used for calculating the probability that the moving object A having moved to the cell b10 in the second iteration moves to each of the eight cells b adjacent to the cell b10 in the third iteration is calculated as follows.

That is, three probabilities are calculated: the probability $Pr(b2|b_{0:0}) \times Pr(b10|b_{0:1})$ (where $b_{i-1}$ is b2) that the moving object A moves to the cell b10 through the path b1→b2→b10; the probability $Pr(b3|b_{0:0}) \times Pr(b10|b_{0:1})$ (where $b_{i-1}$ is b3) that the moving object A moves to the cell b10 through the path b1→b3→b10; and the probability $Pr(b9|b_{0:0}) \times Pr(b10|b_{0:1})$ (where $b_{i-1}$ is b9) that the moving object A moves to the cell b10 through the path b1→b9→b10. The average of these probabilities is used as $Pr(b_{0:2})$ in the above case.

Figure 11A:
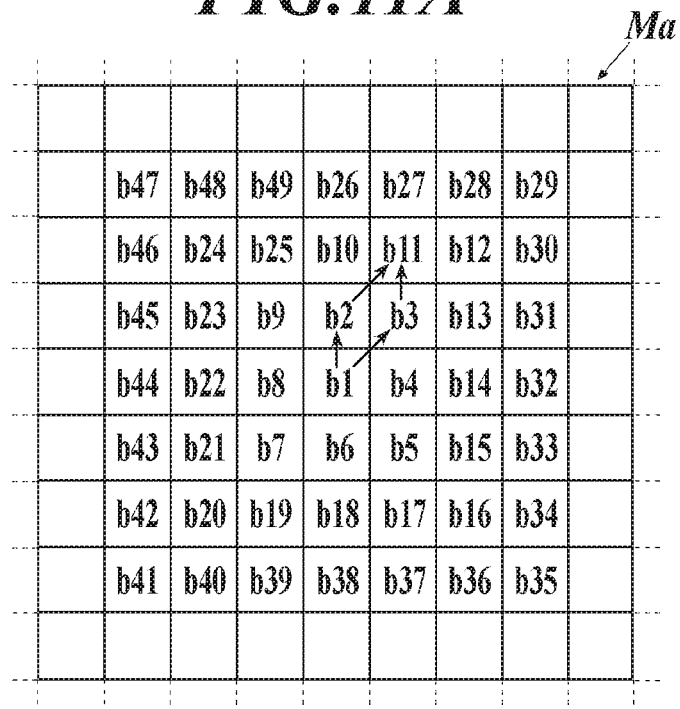
FIG. 11A is a diagram for explaining a path of the moving object from the cell b1 to the cell b11.

As for the probability $Pr(b_{0:2})$ used in calculation of the probabilities that the moving object A having moved to the cell b11 in the second iteration moves to each of the adjacent eight cells b in the third iteration, two probabilities are calculated as shown in FIG. 11A: the probability $Pr(b2|b_{0:0}) \times Pr(b11|b_{0:1})$ (where $b_{i-1}$ is b2) that the moving object A moves to the cell b11 through the path b1→b2→b11; and the probability $Pr(b3|b_{0:0}) \times Pr(b11|b_{0:1})$ (where $b_{i-1}$ is b3) that the moving object A moves to the cell b11 through path b1→b3→b11. The average of these probabilities is used as $Pr(b_{0:2})$ in the above case.

Figure 11B:
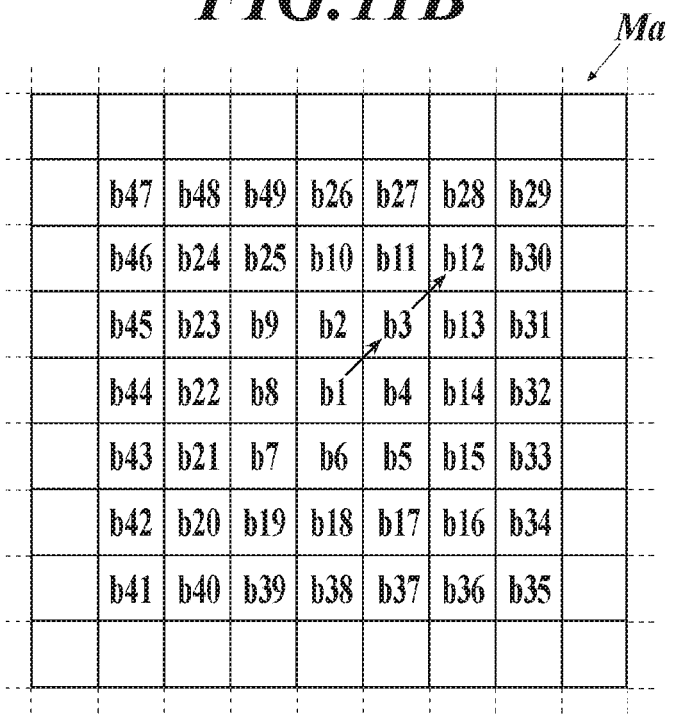
FIG. 11B is a diagram for explaining a path of the moving object from the cell b1 to the cell b12.

Further, as for $Pr(b_{0:2})$ used in calculation of the probabilities that the moving object A having moved to the cell b12 in the second iteration moves to each of the adjacent eight cells b in the third iteration, the probability $Pr(b3|b_{0:0}) \times Pr(b12|b_{0:1})$ (where $b_{i-1}$ is b3) that the moving object A moves to the cell b12 through the path b1→b3→b12 as shown in FIG. 11B is calculated. The calculated probability is used as $Pr(b_{0:2})$ in the above case.

As described above, $Pr(b_{0:i-1})$ used in the calculation of each iteration is calculated in consideration of possible paths for each iteration and for each cell b.

As described above, when the map generator 40 calculates the probability $Pr(B_i|b_{0:i-1})$ for each of the cells b according to the formula (3) and stores the calculated probability $Pr(B_i|b_{0:i-1})$ in the memory at a region corresponding to the each of the cells b, eight probabilities $Pr(B_i|b_{0:i-1})$ are stored in the memory at the respective regions corresponding to the respective cells b.

Therefore, in the present embodiment, the map generator 40 calculates the probability $Pr(B_i|b_{0:i-1})$ for all the cells b in the map Ma as described above, and then calculates the average of the eight probabilities $Pr(B_i|b_{0:i-1})$ stored in the memory at the region for each region corresponding to the each of the cells b.

The average of the eight probabilities $Pr(B_i|b_{0:i-1})$ calculated for each cell b in this way is the probability for each cell (for each of the areas) that the moving object A passes through each of the cells b in the map Ma (that is, each of the areas r in the movable region R), which is the final purpose.

In the present embodiment, using the probability distribution model Mo (probability density function $f(\theta)$) generated by the probability distribution model generator 30 as described above, the map generator 40 calculates probabilities that the moving object A passes through the respective areas r (the cells b) into which the movable region of the moving object A is divided, and generates a probability map Ma in which the calculated probabilities are assigned to the respective areas r (cells b).

Figure 12A:
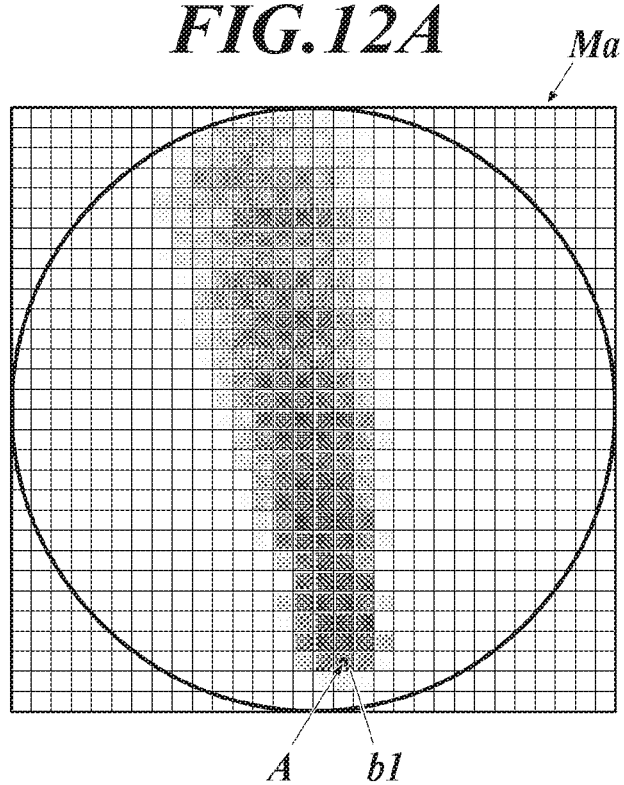
FIG. 12A is a diagram showing an example of a generated map, in which the moving object is traveling straight.

For example, when the moving object A (for example, a ship) travels straight and the map Ma is prepared as described above, cells b through which the moving object A will pass with a high probability are distributed in a narrow range centering on the traveling direction θn (in this case, a direction slightly west from true north (upward in the drawing)) of the moving object A in the obtained map Ma as shown in FIG. 12A. The behavior prediction system 1 can display the map Ma on the display 50.

This result corresponds to a result of stochastic prediction by a human who observed the moving object A traveling straight that "the moving object A is currently sailing slightly westward from true north, and there is a high probability that the moving object A will continue sailing in that direction."

Figure 12B:
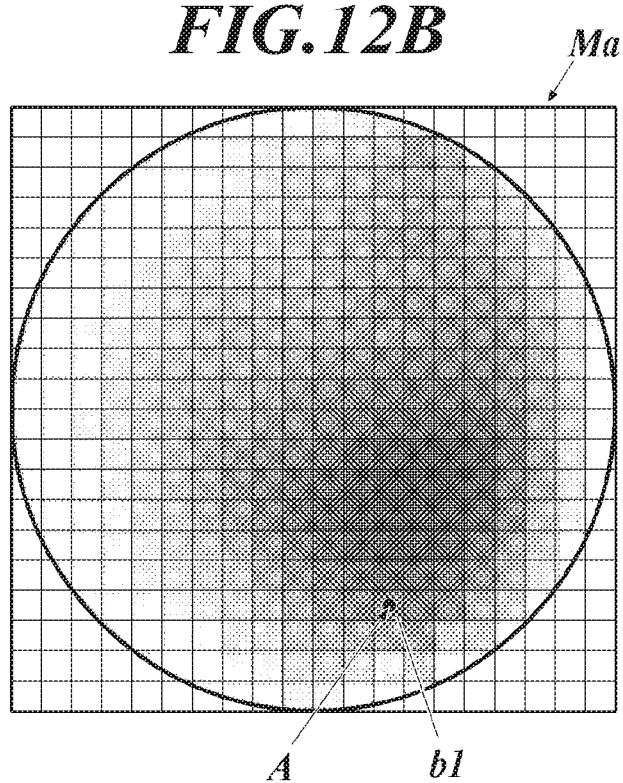
FIG. 12B is a diagram showing an example of a generated map, in which the moving object moves while changing the traveling direction to right and left.

Further, for example, when the moving object A (for example, a suspicious ship) moves while changing the traveling direction θn to the left and right and the map Ma is prepared as described above, cells b through which the moving object A will pass with a high probability spread in the side of the traveling direction θn of the moving object A in the obtained map Ma as shown in FIG. 12B, for example. The behavior prediction system 1 can display the map Ma on the display 50.

This result corresponds to a result of stochastic prediction by a human who observed the moving object A while changing the traveling direction that "the moving object A is currently sailing northward, but the probability that it continues traveling in that direction is low."

Figure 16:
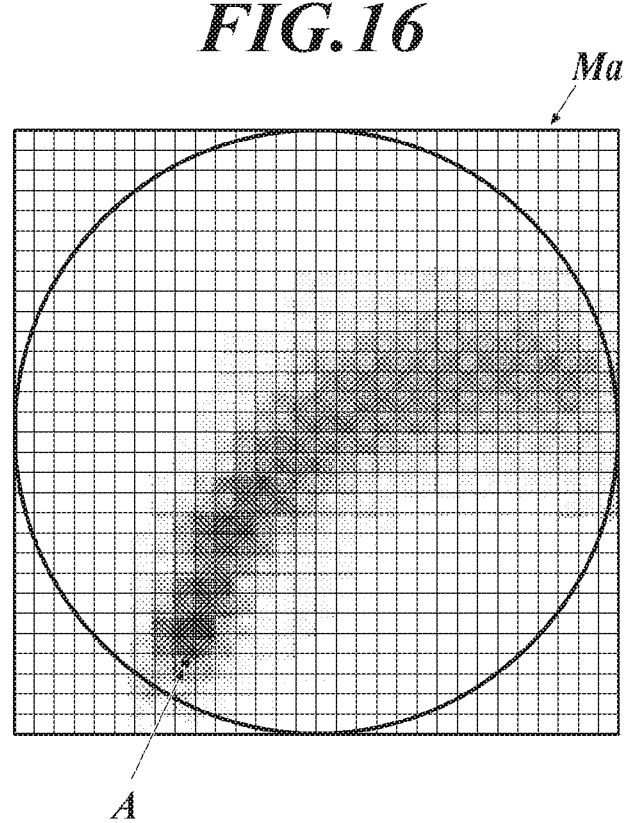
FIG. 16 is a diagram showing an example of a map reflecting turn of the moving object.

In FIGS. 12A, 12B, and 16 to be described later, the probability calculated for each cell of the map Ma is expressed by shading (i.e., the higher probability is represented to be darker).

Effects

As described above, in the behavior prediction system 1 according to the present embodiment, the probability distribution model generator 30 generates a probability distribution model Mo (probability density function $f(\theta)$) regarding the traveling direction $\theta n$ of the moving object A on the basis of the information on the traveling direction $\theta n$ of the moving object A obtained by the information obtainer 10, so that the map generator 40 uses the generated probability distribution model Mo (probability density function $f(\theta)$) to calculate the probability that the moving object A passes through the area r for each of the areas r into which the movable region R of the moving object A is divided, and to generate the probability map Ma in which the calculated probabilities are assigned to the respective areas r.

Therefore, according to the behavior prediction system 1 of the present embodiment, a material for stochastically predicting the behavior of the moving object A, that is, a probability map Ma for stochastically predicting the behavior of the moving object A as a human does, can be automatically generated and provided to the user.

The map Ma can be utilized as follows, for example.

For example, when an airplane such as a patrol airplane tracks a ship of unknown nationality, an airplane of unknown nationality, or the like, a map Ma is generated, the behavior of the moving object A is predicted, and the patrol airplane and the like moves in advance to the area r where the moving object A passes with high probability and thereby captures the moving object A with high probability.

Further, for example, when an airplane avoids collision with another airplane (moving object A), a map Ma is generated, the behavior of the moving object A is predicted, and the airplane avoids an area r through which the moving object A passes with a high probability and thereby avoids the collision reliably and efficiently with a minimum maneuver.

Furthermore, for example, when a formation flight is performed, even if the leader plane does not give an instruction, consort planes generate a map Ma, predict the behavior of the leader plane (moving object A), and grasp the intention of the leader plane, and thereby follow the leader plane smoothly.

Modified Example 3

When the moving object A (for example, a ship) is turning, the traveling direction $\theta$ of the moving object A varies over time.

Therefore, the probability distribution model Mo (probability density function $f(\theta)$) generated by the probability distribution model generator 30 in the above embodiment has a wide width (for example, half width), and in the map Ma generated based on the probability distribution model Mo, the cells b through which the moving object A passes with a high probability may spread on the side of the traveling direction $\theta n$ as shown in FIG. 12B.

However, a map Ma accurately reflecting the turning of the moving object A can be generated as shown in FIG. 16 as described below, when the turning rate of the moving object A is calculated and the probability distribution model Mo (probability density function $f(\theta)$) is modified and used based on the calculated turning rate.

Hereinafter, this modified example 3 will be described.

In this case, when the information obtainer 10 (see FIG. 1) obtains the information on the traveling direction $\theta n$ of the moving object A as described above, the map generator 40 calculates the position (s, t) of the moving object A based on the obtained information. For example, s is longitude and t is latitude.

The position (s, t) of the moving object A is calculated each time the information obtainer 10 obtains the information on the traveling direction $\theta n$ of the moving object A.

Figure 13:
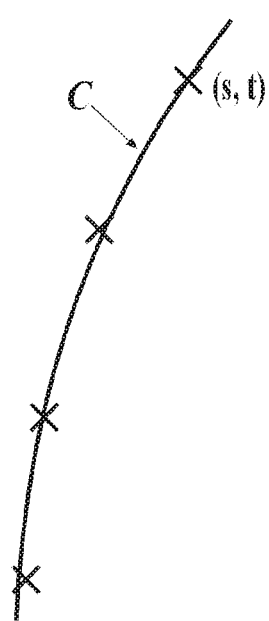
FIG. 13 is a diagram showing an example of a circle approximating the plotted positions of the moving object.

Then, as shown in FIG. 13, the map generator 40 plots the respective calculated positions (s, t) on a virtual plane (see "x" in the drawing), approximates them with, for example, a circle C, and calculates the curvature of a circle Cma (shown not in FIG. 13 but in FIG. 15 described later) on the map Ma corresponding to the circle C.

The map generator 40 uses the calculated curvature of the circle Cma as the turning rate on the map Ma of the moving object A. The turning rate is calculated each time the information obtainer 10 obtains the information on the traveling direction $\theta n$ of the moving object A.

Figure 14A:
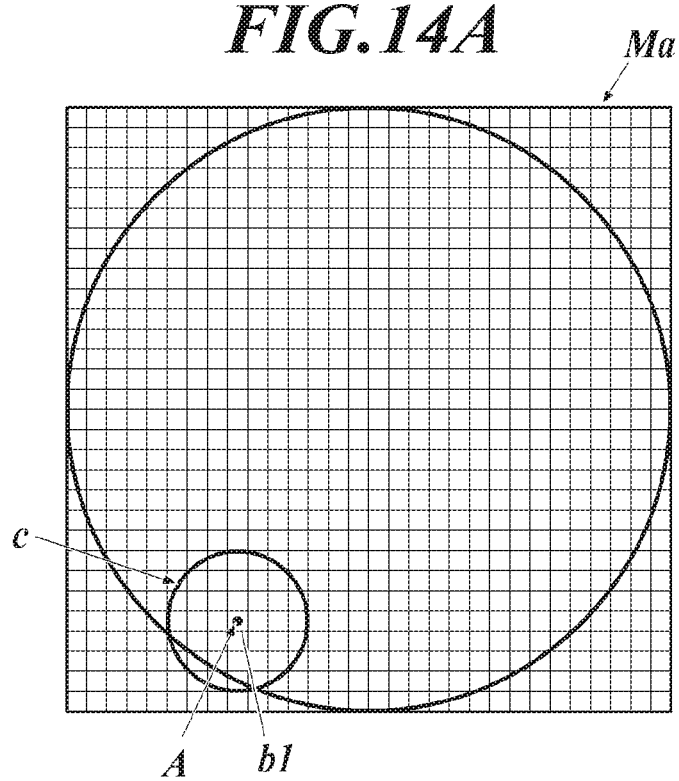
FIG. 14A shows an example of a reference circle on a map with a current cell of the moving object as a center.

Furthermore, the map generator 40 calculates the turning rate of the moving object A in this way, and at the same time sets a reference circle c on the map Ma with the current cell b1 of the moving object A as the center as shown in FIG. 14A. The diameter of the reference circle c is appropriately determined.

The probabilities that the moving object A passes through the respective cells b in the reference circle c are calculated in the same manner as in the above embodiment. When the probabilities of the respective cells b in the reference circle c is calculated, the probability of the cell b outside the reference circle c is also calculated if necessary.

Figure 14B:
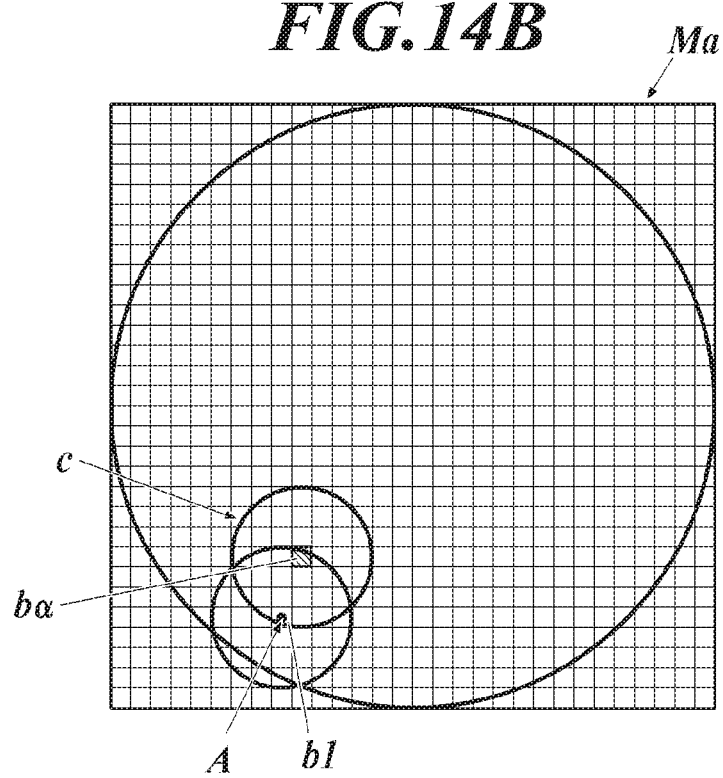
FIG. 14B shows an example of a reference circle on a map with a cell from which the highest probability is calculated.

Then, as shown in FIG. 14B, the map generator 40 extracts the cell b$\alpha$ from which the highest probability is calculated among the cells b in the reference circle c, and sets a new reference circle c with the cell b$\alpha$ as a center in the map Ma.

For each of the cells b in the newly set reference circle c, the probability that the moving object A passes through the cell b is calculated in the same manner as described above.

Figure 15:
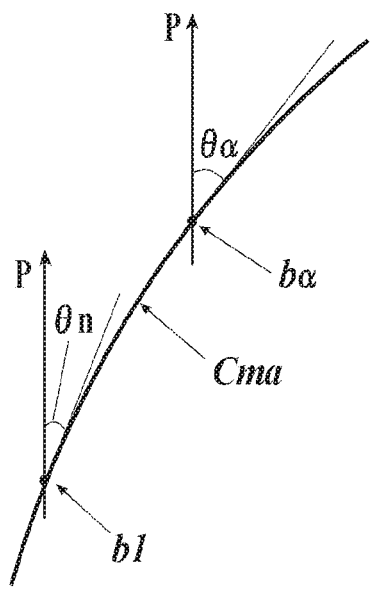
FIG. 15 is a diagram for explaining a method of calculating the traveling direction θα for correcting the probability distribution model.

At this time, as shown in FIG. 15, the map generator 40 calculates the traveling direction $\theta\alpha$ when the moving object A moves to the cell b$\alpha$ on the basis of the turning rate of the moving object A on the map Ma calculated as described above and a relative positional relationship between the center of the cell b1 and the center of the cell b$\alpha$.

Then, the map generator 40 modifies the reference angle $\mu$ of the probability density function $f(\theta)$ (see, for example, FIG. 2) or the probability distribution model Mo generated by the probability distribution model generator 30 as described above, by shifting the reference angle $\mu$ from the traveling direction $\theta n$ at the cell b1 to the calculated traveling direction $\theta\alpha$. In this case, $f(\theta)$ (see, for example, FIG. 2) is modified so as to shift to the left or right by the difference between $\theta n$ and $\theta\alpha$.

Then, the map generator 40 applies the probability density function $f(\theta)$ (that is, the probability distribution model Mo) modified in this way, and calculates the probabilities that the moving object A passes through the respective cells b in the newly set reference circle c shown in FIG. 14B in the same manner as above.

In the Modified Example 3, the map generator 40 is configured to generate the map Ma by repeatedly performing the above-described processing, that is, calculating the turning rate, setting the reference circle c, extracting the cell b$\alpha$ with the highest probability, and calculating respective probabilities to which the modified $f(\theta)$ is applied. The behavior prediction system 1 can display the map Ma on the display 50.

When the map Ma is generated as described above, for example, when the moving object A is turning to the right, the obtained map Ma can reflect the turn of the moving object A accurately as shown in FIG. 16.

Therefore, when such a map Ma is used, it is possible to perform the above-described operations more accurately, for example, in tracking a ship of unknown nationality, an airplane of unknown nationality, or the like, avoiding collision with the moving object A, or performing a formation flight.

In fact, the map Ma shown in FIG. 12A in the above embodiment was also generated according to this modified example 3 (FIG. 12A shows an example where the above turning rate is 0 (zero)).

In the map Ma shown in FIGS. 12A and 16, the probability assigned to each of the cells b pulsates (that is, the probability increases or decreases repeatedly along the direction in which the moving object A travels straight (in the case of FIG. 12A) or turns (in the case of FIG. 16)). This is caused because the map Ma is generated using the reference circle c in the modification example 3 as described above. For example, if the reference circle c is set to be very small, such a pulsation of probability is eliminated.

Although some embodiments of the present disclosure have been described and illustrated in detail, the disclosed embodiments are made for purposes of not limitation but illustration and example only. The scope of the present disclosure should be interpreted by terms of the appended claims.

For example, in the above-described embodiments, the probability distribution model generator 30 has been described to generate the probability distribution model Mo using the Von Mises distribution, but it is also possible to generate the probability distribution model Mo using other distributions.

Furthermore, for example, in the above-described embodiments, the probability is calculated and assigned to each of the cells b (areas r) in the outline circle in the map Ma, but the probability can be also calculated and assigned to each of the cells b (areas r) outside of the outline circle.

Furthermore, for example, it is described in the above embodiments that the probability is calculated and assigned to all the cells b (areas r) (that is, within the region which radar from airplane such as patrol airplane can reach) in the outline circle in the map Ma, but the probability may be calculated and assigned to each of the cells b (areas r) only in a predetermined region in the outline circle in the map Ma.

What is claimed is:

1. A behavior prediction system comprising:
a processor; and
a display,
wherein the processor is programmed to perform as:
    an information obtainer that obtains information on a traveling direction of a moving object whose behavior is to be predicted;
    a probability distribution model generator that generates a probability distribution model regarding a traveling direction of the moving object based on a movable region of the moving object and the information on an obtained traveling direction of the moving object; and
    a map generator that uses the probability distribution model to calculate probabilities that the moving object passes through respective areas into which the movable region of the moving object is divided and that generates a probability map in which the probabilities are assigned to the respective areas, the probability map having a same shape as that of the movable region,
    wherein the probability distribution model generator generates the probability distribution model based on data on the traveling direction of the moving object,
    wherein the data includes first data calculated based on first information on the traveling direction of the moving object and second data calculated based on second information of the traveling direction of the moving object, the second information being obtained by the information obtainer subsequent to the first information, and
    wherein the display displays the probability map.

2. The behavior prediction system according to claim 1, wherein
the probability distribution model generator generates the probability distribution model based on the information on the obtained traveling direction of the moving object according to directional statistics.

3. The behavior prediction system according to claim 2, wherein
the probability distribution model generator generates the probability distribution model using von Mises distribution.

4. The behavior prediction system according to claim 2, wherein,
in response to change in tendency of a traveling direction of the moving object, the probability distribution model generator resets the data on the traveling direction of the moving object calculated before the change based on the information on the traveling direction of the moving object, and generates the probability distribution model based on data on a newly calculated traveling direction of the moving object.

5. The behavior prediction system according to claim 2, wherein,
the map generator calculates probabilities that the moving object passes through the respective areas by a dynamic programming method.

6. The behavior prediction system according to claim 1, wherein
the probability distribution model generator generates the probability distribution model using von Mises distribution.

7. The behavior prediction system according to claim 6, wherein,
in response to change in tendency of a traveling direction of the moving object, the probability distribution model generator resets the data on the traveling direction of the moving object calculated before the change based on the information on the traveling direction of the moving object, and generates the probability distribution model based on data on a newly calculated traveling direction of the moving object.

8. The behavior prediction system according to claim 6, wherein,
the map generator calculates probabilities that the moving object passes through the respective areas by a dynamic programming method.

9. The behavior prediction system according to claim 1, wherein,
in response to change in tendency of a traveling direction of the moving object, the probability distribution model generator resets the data on the traveling direction of the moving object calculated before the change based on the information on the traveling direction of the moving object, and generates the probability distribution model based on data on a newly calculated traveling direction of the moving object.

10. The behavior prediction system according to claim 1, wherein,
the map generator calculates probabilities that the moving object passes through the respective areas by a dynamic programming method.

11. The behavior prediction system according to claim 10, wherein
the map generator uses the probability distribution model to calculate probabilities that the moving object passes through the respective areas, while calculating a turning rate of the moving object and modifying the probability distribution model based on the turning rate.

12. The behavior prediction system according to claim 1, wherein the system provides another moving object with the probability map (1) to capture the moving object, (2) to avoid colliding with the moving object based on the probability map, or (3) to following the moving object.

13. The behavior prediction system according to claim 12, wherein the probability distribution model generator generates the probability distribution model using von Mises distribution.

14. The behavior prediction system according to claim 12, wherein, in response to change in tendency of a traveling direction of the moving object, the probability distribution model generator resets the data on the traveling direction of the moving object calculated before the change based on the information on the traveling direction of the moving object, and generates the probability distribution model based on data on a newly calculated traveling direction of the moving object.

15. The behavior prediction system according to claim 12, wherein, the map generator calculates probabilities that the moving object passes through the respective areas by a dynamic programming method.

* * * * *